No. 663,629. Patented Dec. 11, 1900.
J. G. HOFFMAN.
CANDY CASTING MACHINE.
(Application filed Aug. 3, 1900.)

(No Model.) 2 Sheets—Sheet 1.

J. G. Hoffman
Inventor
By Wilhelm aus Bonner
Attorneys

Witnesses:
E. A. Volk
F. F. Scherzinger

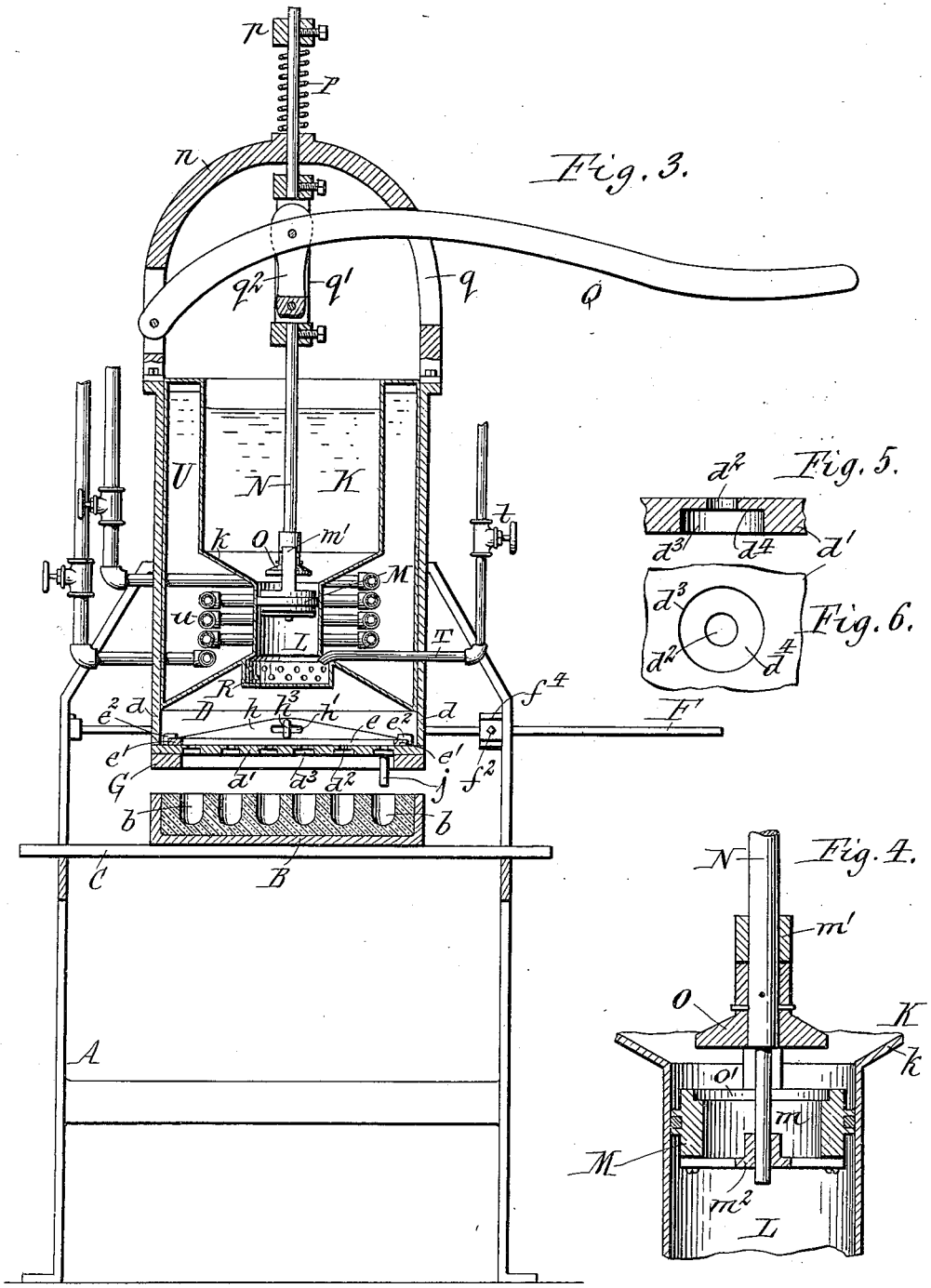

UNITED STATES PATENT OFFICE.

JOSEPH G. HOFFMAN, OF BUFFALO, NEW YORK.

CANDY-CASTING MACHINE.

SPECIFICATION forming part of Letters Patent No. 663,629, dated December 11, 1900.

Application filed August 3, 1900. Serial No. 25,736. (No model.)

*To all whom it may concern:*

Be it known that I, JOSEPH G. HOFFMAN, a citizen of the United States, residing at Buffalo, in the county of Erie and State of New York, have invented new and useful Improvements in Candy-Casting Machines, of which the following is a specification.

This invention relates to a machine for casting candy into molds, which are usually formed in loose starch.

The object of this invention is to produce a simple and efficient machine for this purpose whereby the casting of the candy is effected uniformly and expeditiously and which can be readily adapted for casting candy of different sizes.

Figure 1:
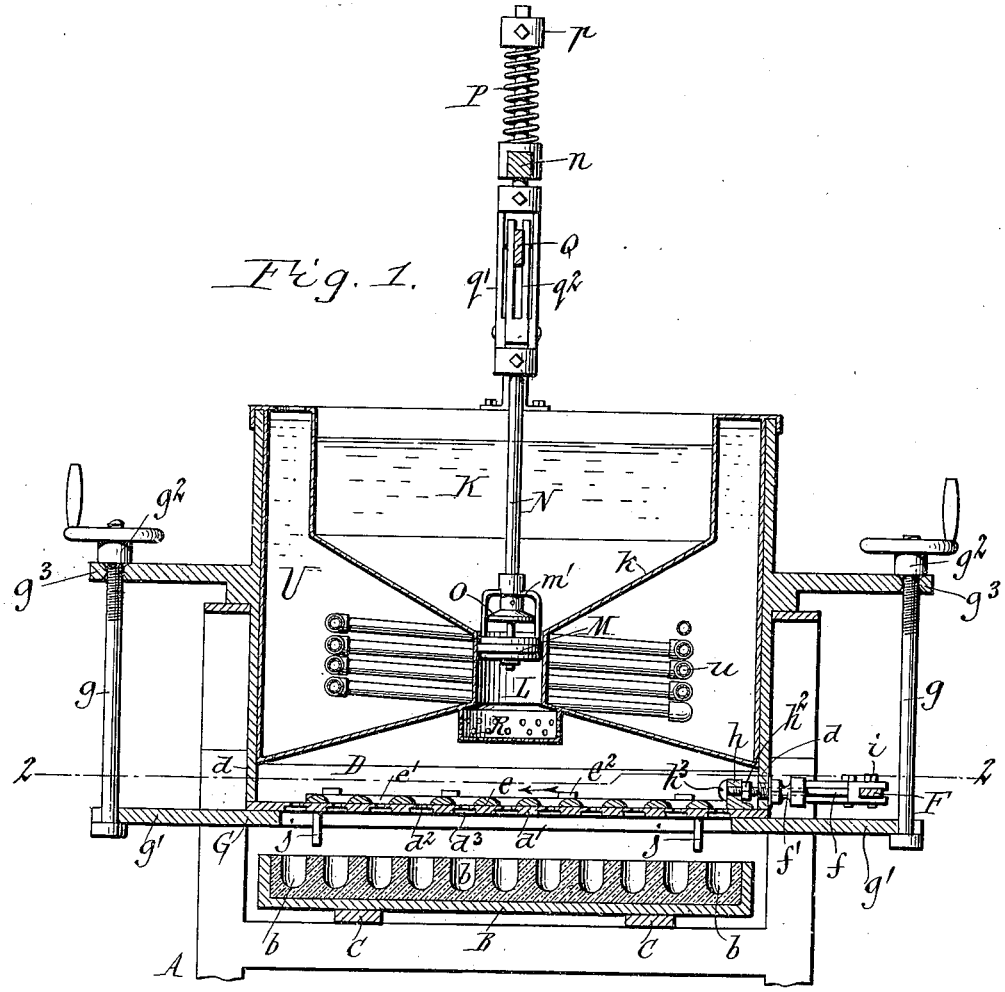
Figure 2:
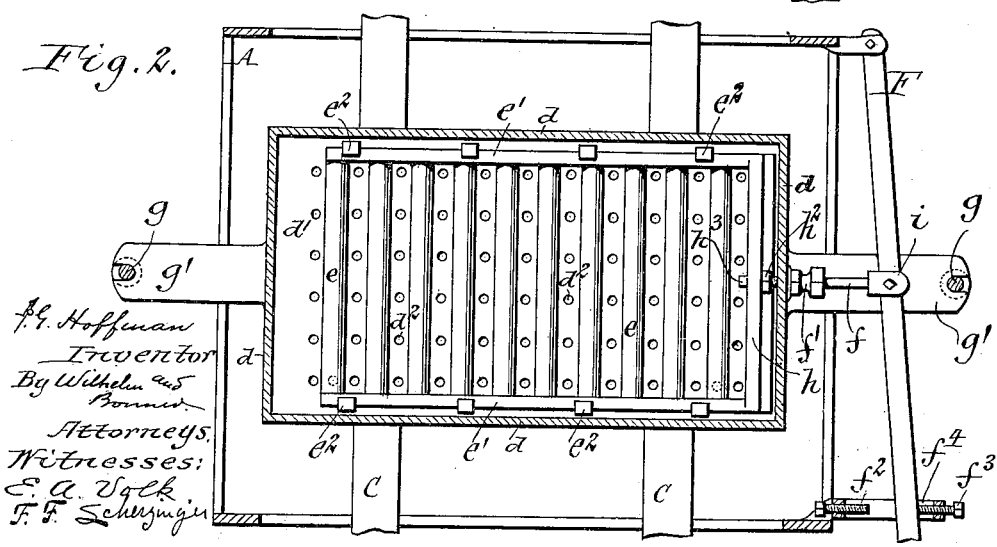

In the accompanying drawings, consisting of two sheets, Figure 1 is a longitudinal sectional elevation of my improved candy-casting machine. Fig. 2 is a horizontal section of the same in line 2 2, Fig. 1. Fig. 3 is a vertical transverse section of the machine. Fig. 4 is a fragmentary sectional elevation, on an enlarged scale, of the syrup-pump or forcing device. Fig. 5 is a fragmentary section, on an enlarged scale, of the bottom-plate of the delivery-chamber, showing one of the discharge-openings therein. Fig. 6 is a bottom view of the same.

Like letters of reference refer to like parts in the several figures.

A represents the main frame of the machine, which may be of any suitable construction.

B represents the tray containing the starch in which the cavities $b$ for casting the candy have been molded. This tray is supported in a horizontal position, with its cavities facing upwardly upon horizontal supporting-bars C, secured to the main frame.

D represents a syrup-delivery chamber, which is arranged above the molding-tray and from which the syrup is delivered into the molded cavities of the tray. The delivery-chamber is provided with vertical side walls $d$ and a flat horizontal bottom-plate $d'$, bearing against the lower edges of the side walls. The bottom-plate has a plurality of discharge-openings $d^2$, which are arranged in transverse rows and in line with the cavities of the tray. These openings are opened and closed by a gate-valve consisting of a plurality of transverse cross-bars $e$, which slide on top of the bottom-plate $d'$ and are connected at their ends by longitudinal side bars $e'$. The gate-valve is capable of a longitudinal reciprocating movement on the bottom-plate and is guided thereon by lugs $e^2$, secured to the bottom-plate and overhanging the side bars of the gate-valve, as shown in Figs. 1, 2, and 3. In the position of the gate-valve shown in Figs. 1 and 2 the same has been shifted so as to uncover the discharge-openings, which permits the syrup to escape from the delivery-chamber into the mold-cavities. Upon shifting the gate-valve in the direction of the arrow, Fig. 1, until the cross-bars $e$ cover the openings $d^2$ the flow of syrup from the delivery-chamber is stopped.

The bottom-plate is made comparatively thick, so as to form a firm support for the syrup in the delivery-chamber. In order to reduce the depth of the openings $d^2$ in the bottom-plate and prevent the syrup from sticking in the same, each of the openings is counterbored at its lower end, as shown at $d^3$, Figs. 1, 3, 5, and 6. The counterbore in each discharge-opening is so formed that a horizontal shoulder or abrupt offset $d^4$ is formed all around the lower end of the discharge-opening. As the syrup issues from the discharge-opening it has no tendency to creep laterally along the horizontal shoulder formed by the counterbore, but drops freely away from the discharge-opening. By this means the surface in the bore of the openings $d^2$ with which the syrup comes in contact is reduced to a minimum and avoids the liability of chilling the syrup in said openings and clogging the same.

The gate-valve may be operated by any suitable means, the means for this purpose which are shown in the drawings consisting of a hand-lever F, pivoted on the main frame adjacent to one end of the delivery-chamber, and a rod $f$, sliding in a stuffing-box $f'$ in the end of the delivery-chamber and connected at its outer end to said lever, while its inner end is connected with the adjacent end bar of the gate-valve. The stroke of the lever F may be adjusted by screws $f^2$ $f^3$, arranged on opposite sides of the lever and mounted in a bracket $f^4$, as shown in Fig. 2.

When small pieces of candy are cast, the mold-cavities in the tray are arranged closer together than when casting large pieces of candy.

In order to adapt this machine for pouring syrup into molds which are spaced differently, the bottom-plate of the delivery-chamber is removable, so that the same can be replaced by a plate having its discharge openings spaced to correspond to the mold-cavities. For this purpose the bottom-plate is pressed with its margin against the lower edges of the walls of the delivery-chamber by a clamping-frame G, which bears against the under side of the bottom-plate. The clamping-frame is detachably connected with the main frame by two vertical clamping-bolts $g$, which bear with their lower headed ends against the under side of bifurcated lugs $g'$ on the clamping-frame and which are provided at their upper screw-threaded ends with hand screw-nuts $g^2$, bearing against lugs $g^3$, projecting from the main frame. Upon loosening the screw-nuts $g^2$ the lower headed ends of the clamping-bolts may be disengaged from the lugs of the clamping-plate and permit the bottom-plate then in use to be removed and replaced by another. The gate-valve is detachably connected with its actuating-rod $f$, so that it can be removed from the delivery-chamber together with the bottom-plate. The detachable connection between the gate-valve and the actuating-rod shown in the drawings, Figs. 1, 2, and 3, consists of an upright lug $h$, arranged on the end cross-bar of the gate-valve and having an elongated opening or slot $h'$, which receives the actuating-rod, a collar or shoulder $h^2$, arranged on the rod and bearing against the outer side of the lug $h$, and an elongated or flattened head $h^3$, arranged on the actuating-rod and bearing against the inner side of the lug $h$. In the normal position of the actuating-rod its flattened or elongated head is arranged across the slot $h'$ in the lug $h$, whereby the latter is confined on the rod $f$ between its collar $h^2$ and head $h^3$, and these parts move together. The actuating-rod is held in its operative position by the pin $i$, which pivotally connects its bifurcated outer end to the operating-lever F. Upon disconnecting the rod $f$ from the lever F by withdrawing the pin $i$ and turning the actuating-rod so that its elongated head registers with the elongated opening of the lug $h$ the gate-valve may be removed from the actuating-rod.

In order to enable the operator to place the tray readily in the proper position so that its mold-cavities are below the discharge-openings of the delivery-chamber, each bottom-plate is provided on its under side with two guide-pins $j$, which are arranged in line with the first row of openings in the bottom-plate. When the operator places the tray with its first row of cavities in line with the pins and with the openings $d^2$, the tray is in the proper position to have its cavities filled by the syrup-discharge openings.

In order to cause the syrup to flow quickly through the discharge-openings of the delivery-chamber, and thereby increase the capacity of the machine, a pressure device is provided whereby pressure is applied to the syrup in the delivery-chamber. The preferred form of pressure device is shown in Figs. 1, 3, and 4 and is constructed as follows:

K represents a supply tank or reservoir which is arranged in the upper part of the machine and which contains the supply of syrup from which the candy is cast. This tank is open at its upper end and is provided with a bottom $k$, which slopes toward the center.

L represents a vertical cylinder which is connected at its upper end with the lowermost part of the sloping bottom of the supply-tank, while its lower end opens into the top of the delivery-chamber, as shown in Figs. 1 and 3.

M represents a plunger or piston fitting into the cylinder and provided with an axial or longitudinal passage $m$ and with cross-pieces $m'$ $m^2$ at its upper and lower ends.

N represents a vertical actuating-rod which is guided at its lower end in the cross-pieces of the plunger and guided at its upper end in a transverse bridge $n$, secured to the upper end of the main frame.

O represents a valve which is adapted to open or close the passage in the plunger and which is mounted on the actuating-rod N between a valve-seat $o'$ at the upper end of the plunger and the upper cross-piece $m'$ of the plunger. Upon raising the actuating-rod the valve O, connected therewith, is lifted from its seat and engages with the upper cross-piece $m'$ of the plunger, whereby the passage in the plunger is opened and the plunger is raised, together with the actuating-rod, as shown in Figs. 1, 3, and 4. In this position of the pressure device the syrup flows from the supply-tank through the hollow plunger and through the cylinder into the delivery-chamber. Upon now lowering the actuating-rod N the first part of this movement causes the valve O to be moved downwardly against the seat on the upper end of the plunger, thereby closing the passage in the plunger. During the continued downward movement of the actuating-rod the plunger moves downwardly with the rod and acts like a solid plunger, owing to its passage being closed by the valve, whereby the syrup in the cylinder is forced downwardly into the delivery-chamber and pressure is applied to all of the syrup below the plunger. During the first part of the subsequent upward movement of the actuating-rod the plunger remains standing until the valve has been raised from its seat on the plunger and engages with the upper cross-piece $m'$ thereof. After the valve has engaged the cross-piece $m'$ the plunger is caused to move upwardly with the actuating-rod to the end of its upward stroke. As the plunger moves upwardly the syrup above the same flows downwardly through the plunger, thereby preventing the plunger from producing a suction during its upward stroke on the syrup below the same. The construction of the plunger and its valve causes the passage of the plunger to be positively closed by the valve before the plunger begins its downward stroke, and it also causes the passage of the plunger to be fully opened before the plunger begins its upward stroke, thereby insuring effective working of the pressure device. The actuating-rod N and the parts connected therewith are balanced and yieldingly held in an elevated position by a spring P, surrounding the upper end of the rod and bearing with its ends against the top of the bridge $n$, and a collar $p$, secured to the actuating-rod, as shown in Figs. 1 and 3.

Q represents a hand-lever whereby the plunger and the parts connected therewith are raised and lowered. This lever is pivoted at its rear end to the rear part of the bridge $n$, while its front end passes through a vertical slot $q$ in the front part of the bridge $n$. The actuating-rod N is preferably divided into two sections, which are connected by a loop $q'$, and are connected therewith by a bifurcated link $q^2$. The upward movement of the hand-lever Q is limited by a stop formed by the upper end of the slot $q$ in the bridge $n$.

In operating the machine the operator first places a mold-tray below the delivery-chamber, then uncovers the openings in the bottom of the delivery-chamber by shifting the gate-valve, and then depresses the plunger by means of its hand-lever.

R represents a perforated distributing-head which is arranged at the lower end of the cylinder, as shown in Figs. 1 and 3. This head causes the pressure of the plunger to be distributed uniformly over the whole body of syrup in the delivery-chamber, thereby producing a uniform flow of the syrup out of the discharge-openings and filling the molds uniformly. In the absence of the perforated head the syrup in the delivery-chamber immediately below the cylinder would receive a greater pressure than the syrup in the sides of the delivery-chamber, thereby causing an unequal flow of the syrup and unequal filling of the molds. The perforated head also serves to sustain syrup in the supply-tank and to check the flow of syrup from the supply-tank into the delivery-chamber, thereby preventing undue pressure in the delivery-chamber and enabling the operator to control the pressure by means of the plunger.

When the operation of the machine is interrupted for a time—for instance, when stopping the same from one day to another—the syrup in the distributing-head is liable to crystallize and clog the openings in the same. In order to enable these openings to be easily cleared after stopping the machine, steam is introduced into the head by means of a pipe T, having a valve $t$.

U represents a water-chamber which incloses the supply-tank, the syrup-cylinder, and the upper part of the delivery-chamber. A coil $u$, through which hot water or steam circulates, is arranged in the water-jacket and keeps the water and the syrup inclosed by the same at the required temperature to cause the syrup to flow properly.

My improved casting-machine is very simple and inexpensive in construction and not liable to get out of order, and it permits of rapidly filling an entire tray of molds at a time.

I claim as my invention—

1. The combination with the delivery-chamber of a candy-casting machine provided with side walls and a removable perforated bottom, of a slide-valve whereby the perforations in said bottom are opened and closed, and a clamping-frame whereby said bottom is held against said side walls, substantially as set forth.

2. The combination with the delivery-chamber of a candy-casting machine provided with vertical side walls and a removable perforated bottom bearing against the lower edges of the side walls, of a slide-valve adapted to open and close the perforations in the bottom, a clamping-frame bearing against the lower side of the bottom, and vertical clamping-bolts engaging with their lower headed ends against lugs on the clamping-frame and provided at their upper screw-threaded ends with screw-nuts which bear against lugs on the stationary part of the machine, substantially as set forth.

3. The combination with the delivery-chamber of a candy-casting machine having vertical side walls and a removable perforated bottom bearing against the lower edges of the side walls, of a slide-valve arranged on top of said bottom and adapted to open and close the perforations therein, a lever arranged outside of said chamber, a rod passing through a side wall of the chamber and connected at its outer end with said lever and arranged with its inner end in a slotted lug on the slide-valve, a collar arranged on said rod and bearing against one side of said lug and an elongated head arranged on said rod and bearing against the opposite side of said lug, substantially as set forth.

4. The combination with a delivery-chamber provided with a bottom-plate having discharge-openings each of said openings provided around its discharge end with a shoulder or offset, and a valve whereby said openings are opened and closed, substantially as set forth.

5. The combination with a delivery-chamber provided with a perforated bottom, and a valve whereby the perforations in the bottom are opened and closed, of a supply-tank arranged above the delivery-chamber, a cylinder connecting the supply-tank with the delivery-chamber, and a plunger arranged in said cylinder, substantially as set forth.

6. The combination with a delivery-chamber provided with a perforated bottom, and a valve whereby the perforations in the bottom are opened and closed, of a supply-tank arranged above the delivery-chamber, a cylinder connecting the supply-tank with the delivery-chamber, a plunger arranged in said cylinder and provided with a passage through the same, and a valve whereby said passage is opened and closed, substantially as set forth.

7. The combination with a delivery-chamber provided with a perforated bottom, and a valve whereby the perforations in the bottom are opened and closed, of a supply-tank arranged above the delivery-chamber, a cylinder connecting the supply-tank with the delivery-chamber, a plunger arranged in said cylinder and provided with an axial passage and with a valve-seat at its upper end, a reciprocating actuating-rod which receives a cross-piece on the upper end of the plunger, and a valve secured to said actuating-rod between the valve-seat and the cross-piece of the plunger, substantially as set forth.

8. The combination with a delivery-chamber provided with a perforated bottom, and a valve whereby the perforations in the bottom are opened and closed, of a supply-tank arranged above the delivery-chamber, a cylinder connecting the supply-tank with the delivery-chamber, a plunger arranged in said cylinder and provided with an axial passage and with a valve-seat at its upper end, a reciprocating actuating-rod which receives a cross-piece on the upper end of the plunger, a valve secured to the actuating-rod between the valve-seat and the cross-piece of the plunger, and a lever connected with the actuating-rod, substantially as set forth.

9. The combination with a delivery-chamber provided with a perforated bottom, and a valve whereby the perforations in the bottom are opened and closed, of a supply-tank arranged above the delivery-chamber, a cylinder connecting the supply-tank with the delivery-chamber, a plunger arranged in said cylinder and provided with a longitudinal passage and at its upper end with a valve-seat and with a cross-piece, an actuating-rod provided with upper and lower sections which are guided, respectively, in a bridge on the stationary part of the machine and in the cross-piece of the plunger, a valve secured to the lower section of the actuating-rod between the valve-seat and the cross-piece of the plunger, a loop connecting the upper and lower sections of the actuating-rod, a lever pivoted on said bridge, and a link connecting said lever with said loop, substantially as set forth.

10. The combination with the delivery-chamber provided with a perforated bottom, and the valve whereby the perforations in said bottom are opened and closed, of a supply-tank arranged above said chamber and connected therewith by a cylinder, a plunger arranged in said cylinder, and a perforated head arranged at the outlet of said cylinder, substantially as set forth.

Witness my hand this 25th day of July, 1900.

JOSEPH G. HOFFMAN.

Witnesses:
THEO. L. POPP,
CLAUDIA M. BENTLEY.